United States Patent
Nohl et al.

(10) Patent No.: US 6,608,944 B1
(45) Date of Patent: Aug. 19, 2003

(54) VALUE BASED SCORING FOR OPTICAL CHARACTER RECOGNITION

(75) Inventors: Craig R. Nohl, Oakhurst, NJ (US); B Ivan Strom, Cranford, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 763 days.

(21) Appl. No.: 08/901,304

(22) Filed: Jul. 28, 1997

(51) Int. Cl.[7] .................................................. G06K 9/03
(52) U.S. Cl. ........................ 382/309; 382/137; 382/224
(58) Field of Search ................................. 382/309, 310, 382/311, 137, 224, 225, 226, 227, 228, 229, 230, 138, 155, 156, 157, 159, 160, 161, 173; 707/35

(56) References Cited

U.S. PATENT DOCUMENTS

| | | | | |
|---|---|---|---|---|
| 4,813,077 A | * | 3/1989 | Woods et al. | 382/311 |
| 5,040,226 A | * | 8/1991 | Elischer et al. | 382/138 |
| 5,151,948 A | * | 9/1992 | Lyke et al. | 382/311 |
| 5,261,009 A | * | 11/1993 | Bokser | 382/230 |
| 5,303,311 A | * | 4/1994 | Epting et al. | 382/138 |
| 5,455,872 A | * | 10/1995 | Bradley | 382/309 |
| 5,479,570 A | * | 12/1995 | Imagawa et al. | 382/159 |
| 5,555,325 A | * | 9/1996 | Burger | 382/309 |
| 5,621,815 A | * | 4/1997 | Talukdar et al. | 382/159 |
| 5,721,790 A | * | 2/1998 | Klenner | 382/138 |
| 5,805,731 A | * | 9/1998 | Yaeger et al. | 382/159 |
| 5,812,698 A | * | 9/1998 | Platt et al. | 382/186 |
| 5,852,676 A | * | 12/1998 | Lazar | 382/173 |

* cited by examiner

*Primary Examiner*—Yon J. Couso
(74) *Attorney, Agent, or Firm*—Eugene J. Rosenthal

(57) ABSTRACT

A technique is described for producing field recognition scores that vary according to the position of the errors. In particular, a value-based score for a recognition result is determined from both the individual character recognition scores and an "error value" that is associated with each character position of the recognition result. In general, this value-based score is computed by adding the error value for each character position of the recognition result. As illustration, an OCR system for scanning checks is adapted to produce field recognition scores that reflect economic value. In this approach, an error in the leftmost digit is "worth" much more than an error in the rightmost digit.

16 Claims, 1 Drawing Sheet

VALUE BASED SCORING FOR OPTICAL CHARACTER RECOGNITION

FIELD OF THE INVENTION

This invention relates generally to image recognition and, more particularly, to optical character recognition.

BACKGROUND OF THE INVENTION

In practical optical character recognition (OCR) systems, each recognition result (e.g., for the interpretation of a field) is assigned a score representing the "goodness" of the result; often these scores are intended to reflect the probability that the recognition result is correct. The scores are used to determine which results are to be reviewed by a human and which are accepted without review.

A typical approach computes a field recognition score as the product of recognition scores for all the individual characters of the field (as if they were independent probabilities). Traditional recognition techniques for numerical entities, such as zip codes, serial numbers, and account numbers, treat each digit of the number as equally important—an error in the leftmost digit of the number is as significant as an error in the rightmost digit.

SUMMARY OF THE INVENTION

As noted above, the application of traditional recognition techniques implies that errors in, e.g., a dollar (or higher order digits) are roughly equally likely as errors in cents digits. As such, a possible error in the hundred dollars digit of a financial amount is no more likely to receive human review (at additional economic cost) than a similar possible error in the one cent digit. However, we have observed that in the recognition of economic amounts an error in the leftmost digit is "worth" much more than an error in the rightmost digit. Therefore, and in accordance with the inventive concept, we describe a technique for producing field recognition scores as a function of the importance of a position in the image.

In an embodiment of the invention, an OCR system for scanning financial amounts is adapted to produce field recognition scores that reflect economic value. In particular, a value-based score for a recognition result is determined from both the individual character recognition scores and a "value" that is associated with each character position of the recognition result. As used herein, this "value" is referred to as an "error value." In general, the value-based score is computed by adding the error value for each character position of the recognition result. Such an approach is potentially of significant economic value to banks, remittance houses, and similar companies for which the costs associated with correction of error are correlated with the value of the error (e.g. customers are less likely to dispute cent errors than dollar errors).

DETAILED DESCRIPTION

Figure 1:
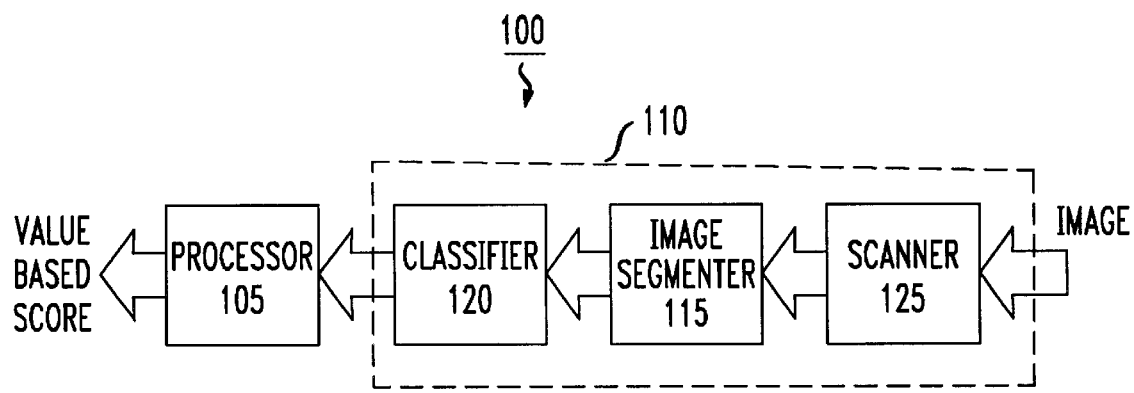
FIG. 1 shows a block diagram of a portion of an OCR system embodying the principles of the invention.

A portion of an illustrative OCR system embodying the principles of the invention is shown in FIG. 1. This portion, 100, of the OCR system, comprises processor 105 and recognizer 110, which further comprises image segmenter 115, classifier 120, and scanner 125. Other than the inventive concept, the elements of FIG. 1 are well-known and will not be described in detail. For example, scanner 125 produces an electronic image (e.g., pixel map, realized as an array of bytes in memory) from a physical input such as a sheet of paper (not shown). Once the image is captured in electronic form, the next major operation is to "segment" the image, e.g., into fields and then to characters within each field. This function is provided by image segmenter 115. The output of the image-segmenter 115 is a set of electronic subimages associated with a specific field; usually each subimage contains just the ink for an individual character, though sometimes the ink contained in a subimage does not correspond exactly to one character. (It should be noted that the terminology such as "subimage containing the ink" is used by those practicing in the art.) Ink associated with a given character may appear in more than one subimage; thus the subimages are the basis for alternative partitionings of a field's ink into characters. Classifier 120 classifies the ink contained in subimages, and provides for each a set of single character recognition scores for recognizing the subimage as each of an alphabet of characters. These character recognition scores are supplied to processor 105, which is representative of a stored-program-controlled processor such as a microprocessor with associated memory.

In accordance with the inventive concept, processor 105 computes a value-based score for a recognition result from both the individual character recognition scores and a "value" that is associated with each character position of the recognition result. As used herein, this "value" is referred to as an "error value." In general, the value-based score is computed by adding the error value for each character position of the recognition result.

The error value for a given character position is allowed to be any function of the recognition scores for each possible recognition result at that position. For example, let:

$r_n(c)$=recognition score for interpreting position n as character c, where the index c ranges over the recognition alphabet $A=\{a^1, a^2, \ldots, a^K\}$, where K is the total number of characters in the alphabet. Then the error value for character position n is:

$$E_n = f_n[r_n(a^1), r_n(a^2), \ldots, r_n(a^K)], \qquad (1)$$

where the function $f_n(\ )$ generally depends on the character position n.

The value-based score for the entire field is then the sum of the error values over all character positions:

$$\text{Field\_error\_score} = \sum_n \{E_n\}. \qquad (2)$$

While there are many possibilities for the set of functions $\{f_n\}$, certain choices are natural.

Returning to FIG. 1, suppose the field to be recognized contains the digits of a financial amount written in well-separated boxes (not shown). Suppose also the boxes are printed in drop-out ink on the original form (not shown), but their positions are known. Then the ink associated with each digit position is unambiguous, and a recognizer is applied to the ink for each digit. Also, suppose the recognition alphabet contains only the digits 0 through 9. For the ink corresponding to a digit position, the recognizer supplies a score between 0 and 1 for each possible interpretation of the ink (0 through 9) representing the probability that the interpretation of the ink is correct. An illustrative recognizer output is shown in Table One, below.

TABLE ONE

| character | 0   | 1   | 2   | 3   | 4   | 5   | 6   | 7   | 8   | 9   |
|-----------|-----|-----|-----|-----|-----|-----|-----|-----|-----|-----|
| score     | 0.0 | 0.0 | 0.9 | 0.0 | 0.0 | 0.0 | 0.0 | 0.1 | 0.0 | 0.0 |

This type of output might indicate that the digit in the recognized position is "2" with an assumed probability of 0.9, and "7" with an assumed probability of 0.1.

As known in the prior art, the best interpretation of the field is constructed by selecting for each digit position the character with the highest score. If the character-level recognizer scores are interpreted as approximate probabilities, the field-level score is normally taken to be the product of the character-level scores. This corresponds to the assumption that errors in the characters of the field are statistically independent of each other.

Now, and in accordance with the inventive concept, an error cost is associated with each digit position, which is shown below in Table 2. (Similarly, a field-error-cost could be defined as the as the sum of the error costs for each digit position.)

TABLE TWO

| Digit     | Cost   |
|-----------|--------|
| 1 cent    | $0.10  |
| 10 cent   | $1     |
| 1 dollar  | $10    |
| 10 dollar | $100   |
| . . .     | . . .  |

Although the values in Table 2 are illustrative, error costs can be estimated from traditional economic analysis. In this example, it is assumed that the values shown in Table 2 generally reflect the total economic cost of an error, in terms of human operator review, customer good will, institutional reputation, etc. As such, this technique produces field recognition scores that reflect economic value.

In this example, a field-level score is defined to be the sum of terms:

$$(\text{error\_cost})(1-\text{best\_score}), \qquad (3)$$

with one such term for each digit position and where (1−best_score) represents the probability of error for each digit position, assuming the scores for each position sum to one. This corresponds to the statistical expected value for the field-error-cost for the best interpretation, assuming that character scores have equal probabilities of correct interpretation, and that character errors are statistically independent of each other.

To write this as a formula, let $r_n(c)$=the estimated probability that the correct interpretation of the character in position n is c, $W_n$=the cost of an error in character position n, and $C_n$=the best interpretation of the character in position n.

Then the field-error score is defined as:

$$\text{field-error score} = \sum_n \{W_n[1 - r_n(C_n)]\}, \qquad (4)$$

which is summed over all character positions in the field.

When the characters of a field are digits (as in a financial amount), one might alternatively create a character position-dependent cost function based on the expected value (in a statistical sense) of the absolute difference between the actual digit and the numerical value of the best-choice OCR result. For example:

$$E_n = W_n \sum_{c_n \in A} |V(c_n) - V(C_n)| r_n(c_n), \qquad (5)$$

where

V(c)=numerical value of character (digit) c, and

|x|=absolute value of x.

It is important to note that even for the case of financial amounts, $W_n$ is not necessarily simply related to the nominal value of an increment on the nth position (i.e., $10 for digits in the "tens column")—as noted above, it generally reflects the total economic cost of an error, in terms of human operator review, customer good will, institutional reputation, etc. That is, this technique produces field recognition scores that reflect economic value.

It should be noted that the use of dollar value of digit is just one of many possibilities. This is potentially of significant economic value to banks, remittance houses, and similar companies for which the costs associated with correction of error are correlated with the value of the error (e.g. customers are less likely to dispute cent errors than dollar errors).

Figure 2:
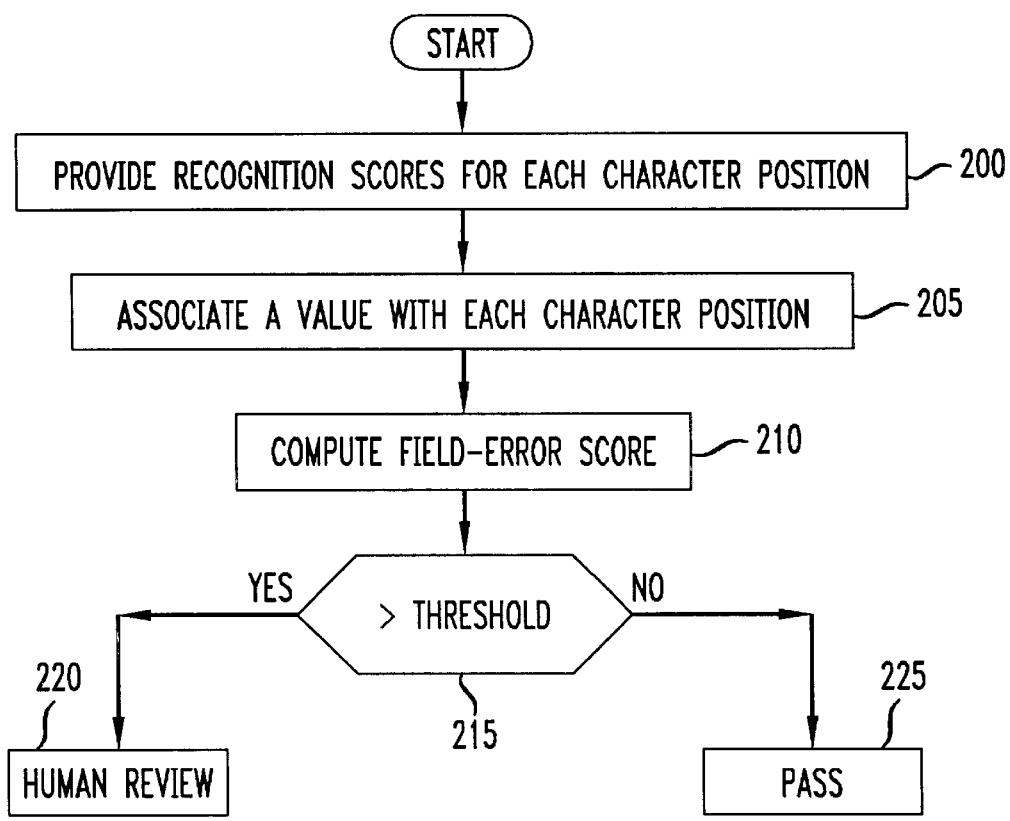
FIG. 2 shows an illustrative method embodying the principles of the invention.

An illustrative method embodying the principles of the invention is shown in FIG. 2. As described above, steps 200 to 210 illustrate the generation of a field-error-score. Once a field-error-score is generated, the latter is compared to a predefined threshold. In this example this threshold is a dollar value such that if the dollar value threshold is exceeded, human review of the image occurs in step 220. If this threshold is not exceeded, then the OCR amount passes in step 225.

The above illustrations were with respect to a known segmentation of a field into characters. However, OCR systems exist with unknown segmentation. In this context, when interpreting a field, many OCR systems consider multiple alternative segmentations of the ink representing a field into characters. For such systems, and for certain recognition algorithms, no recognition score may be available for individual characters, rather only for alternative interpretations of the entire field. However it still may be possible to estimate a recognition score for any possible interpretation of the entire field. (In the examples for which we provide formulas below, we do not actually use every interpretation of the field—normally that is too computationally expensive.) This is true when the Viterbi algorithm or the forward algorithm is used to select and score a field interpretation. In these cases, a value-based field score is constructed as follows.

Let $C_1, C_2, \ldots, C_N$ denote the characters of the top choice OCR result. Suppose that $R(c_1, c_2, \ldots, c_N)$ is the score for the hypothesis that $c_1, c_2, \ldots, c_N$ is the correct field interpretation. Ideally R( ) estimates the probability of correctness, but it could be any function. Then define $$E_n = W_n \left\{ \frac{\sum_{c_n \neq C_n} R(C_1, \ldots, c_n, \ldots, C_N)}{\sum_{c_n \in A} R(C_1, \ldots, c_n, \ldots, C_N)} \right\} \qquad (6)$$

-continued $$= W_n \left\{ 1 - \frac{R(C_1, \ldots, C_n, \ldots, C_N)}{\sum_{c_n \in A} R(C_1, \ldots, c_n, \ldots, C_N)} \right\},$$

where $W_n$ is again the cost of an error in position n.

Or, more generally, $$E_n = W_n \left\{ \frac{\sum_{c_n \neq C_n} g(c_n, C_n) R(C_1, \ldots, c_n, \ldots, C_N)}{\sum_{c_n \in A} R(C_1, \ldots, c_n, \ldots, C_N)} \right\}, \quad (7)$$

where the function $g(c_n, C_n)$ contains the dependency of the error cost on the particular top choice character interpretation versus alternative interpretations in the same character position.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of a financial application, the technique is generally applicable to any OCR problem where the consequences of interpretation errors vary according to the positions of the errors. As an illustration, when routing an object (mailpiece) based on an automatically-read destination code (ZIP Code), the cost of an error in the leftmost character positions of the code may be greater than that for errors in the rightmost positions.

Also, although the illustrative embodiment showed a separate processor responsive to the recognition scores provided by the recognizer, it should be apparent that the recognizer could include the processor functionality.

What is claimed:

1. An improved method for producing a field recognition score from a scanned image for use in an image recognition system, the improvement comprising the step of:
   determining the field recognition score as a function of importance of a character position within a field interpretation of the scanned image.

2. The method of claim 1 wherein each field interpretation comprises a number of character positions, and wherein the determining step includes the steps of:
   assigning a number representative of the importance of each character position;
   receiving a recognition score for each character position; and
   determining a modified recognition score for each character position as a function of the assigned number and the received recognition score.

3. The method of claim 2 wherein the assigned number represents an economic value associated with the cost of an error in each respective position.

4. The method of claim 2 further including the step of summing the modified recognition score of each position to provide the field recognition score.

5. The method of claim 1 wherein each field interpretation comprises a number of character positions, and wherein the determining step includes the steps of:
   assigning a number representative of the importance of each character position;
   receiving a recognition score for each character position; and
   determining a modified recognition score for each character position as a function of the assigned number and a probability of error of the received recognition score.

6. The method of claim 5 wherein the assigned number represents an economic value associated with the cost of an error in each respective position.

7. The method of claim 5 further including the step of summing the modified recognition score of each position to provide the field recognition score.

8. The method of claim 1 further comprising the steps of:
   comparing the field recognition score with a predetermined threshold; and
   if the comparison is greater that the predetermined threshold, rejecting the scanned image.

9. The method of claim 8 wherein the rejecting step includes the step of causing manual review of the rejected scanned image.

10. Apparatus for use in an image recognition system, the apparatus comprising:
    a classifier for providing recognition values for each of a plurality of characters in an image; and
    processing circuitry responsive to the provided recognition values for generating an overall recognition score, wherein the processing circuitry treats at least some of the character positions as more important than the others in generating the overall field recognition score.

11. The apparatus of claim 10 wherein the processor generates the overall recognition score as a function of the provided recognition values and an importance value associated with each of the character positions.

12. The apparatus of claim 11 wherein the importance value represents positional importance of the character position compared to other character positions.

13. The apparatus of claim 12 wherein the positional importance is related to a cost-value for an error in the associated character position.

14. The apparatus of claim 11 wherein the function includes a sum of values, each value being a function of the recognition score and the associated value.

15. The apparatus of claim 11 wherein the function includes a sum of values, each value being a function of a probability of error of the recognition score and the associated value.

16. The apparatus of claim 10 wherein the processor further causes a signal to be provided if the overall recognition score is greater than a predefined threshold.

* * * * *